Dec. 3, 1968 DE FOREST D. BUTLER 3,414,298
AFTERSET INSERT ASSEMBLY FOR AN UNDERFLOOR WIRING DUCT
Filed Aug. 9, 1967
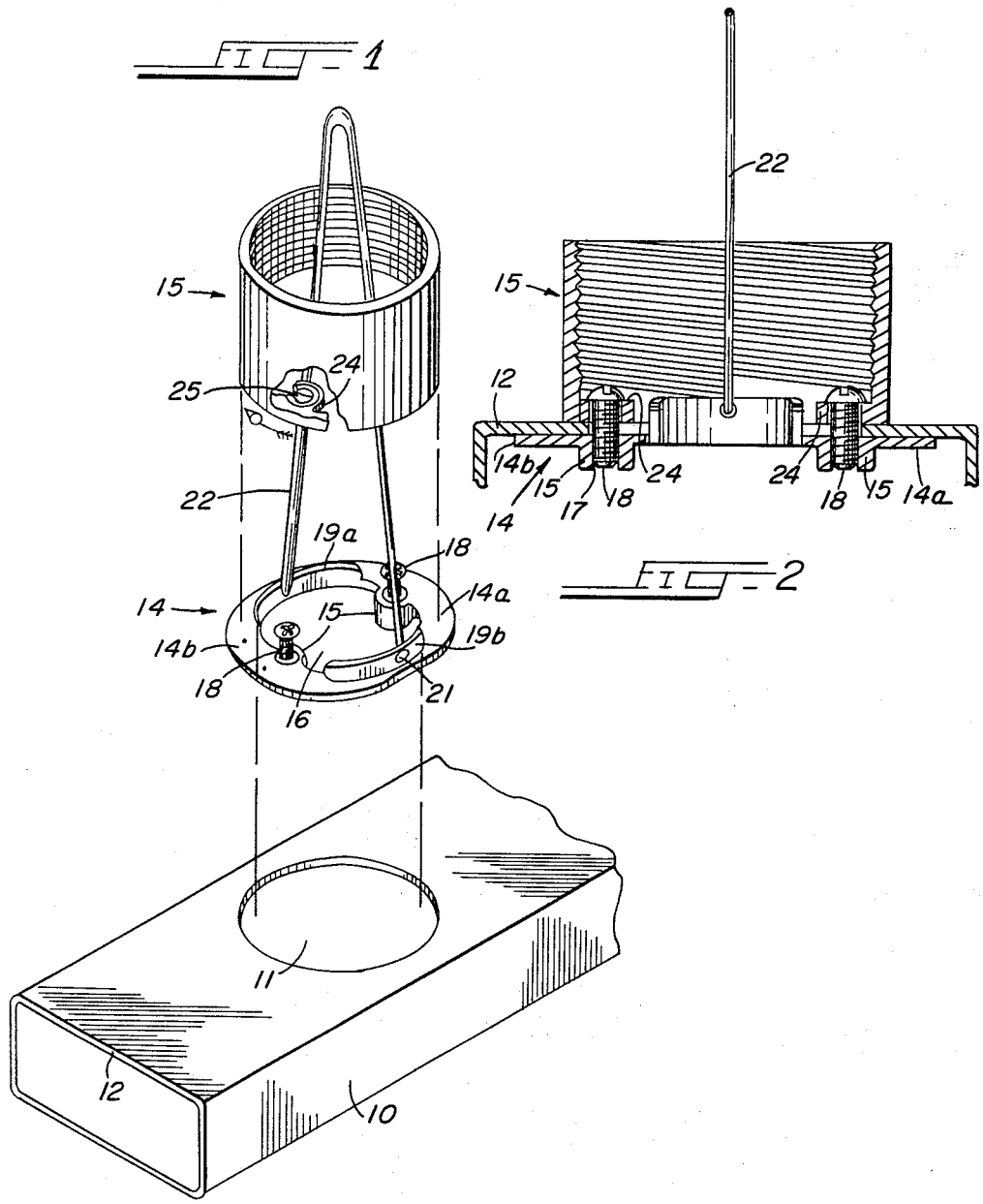
INVENTOR.
DE FOREST D. BUTLER United States Patent Office 3,414,298
Patented Dec. 3, 1968

3,414,298
AFTERSET INSERT ASSEMBLY FOR AN UNDERFLOOR WIRING DUCT
De Forest D. Butler, Lexington, Ky., assignor to Square D Company, Park Ridge, Ill., a corporation of Michigan
Filed Aug. 9, 1967, Ser. No. 659,471
4 Claims. (Cl. 285—209)

ABSTRACT OF THE DISCLOSURE

A non-circular annular clamping element or adapter insertable through a circular opening in an upper wall of the duct has marginal areas engaging the inner surface of the upper wall adjacent the opening and threadedly receives a pair of screws which extend upwardly through the opening. A tubular riser or insert of larger diameter than the diameter of the opening engages the upper wall around the opening and has a pair of inturned flanges provided with respective circumferential slots which receive the shank portions of the screws, respectively.

BACKGROUND OF THE INVENTION

Field of the invention

Electric conduit accessory.

Description of the prior art

In one prior type of afterset insert assembly for underfloor wiring duct or for cells of a cellular floor, a pair of clamping members permanently attached to the lower end of a riser or insert are movable outwardly after passing through an opening in the duct and engage the inner surface of the upper wall of the duct thereby to clamp the riser to marginal areas of the upper wall about the opening. In another prior type of afterset insert assembly, a similar clamping action is provided by non-circular clamping element insertable through the opening in duct and having a circular threaded projection receiving a threaded end portion of the insert. The afterset insert assemblies which use movable clamping elements are relatively complex and require accurately fitting parts. Those which use a threaded connection require special tools to effect the clamping because the riser is generally within the confines of a relatively small opening in a concrete floor and cannot be turned by a conventional wrench.

SUMMARY OF THE INVENTION

In an afterset insert assembly in accordance with this invention, a non-circular annular clamping member insertable through a circular opening in an upper wall of an underfloor wiring duct section or of a cell of a cellular floor has marginal areas which engage the inner surface of the upper wall adjacent the opening. The shank portions of a pair of headed screws having their lower ends threaded into the clamping element extend through the opening adjacent its circumferential edge in diametrically spaced relation with respect to the opening. A cylindrical tubular riser or insert of larger diameter than the opening has a pair of diametrically-spaced inturned flange portions which overlie the opening adjacent its edge when the insert is positioned on the outer surface of the upper wall of the duct or floor cell. The flange portions have respective slots opening in the same circumferential direction. The slots loosely receive the shank portions of the respective screws upon turning of the insert with respect to the clamping element. The screws are then tightened to clamp marginal areas of the upper wall of the duct or cell about the opening between the clamping element and the lower face of the insert.

DESCRIPTION OF THE DRAWING

FIG. 1 is an exploded view of an afterset insert assembly in accordance with this invention showing its relation to an underfloor duct; and
FIG. 2 is a diametrical cross-section of the insert assembly of FIG. 1 after assembly on the duct but before removal of a pair of mounting tongs.

DESCRIPTION OF THE PREFERRED EMBODIMENT

Referring to the drawing, a section of underfloor duct 10 has a circular opening 11 formed in its top wall 12. The opening 11 is to receive the afterset insert assembly of this invention which comprises an annular clamping member or plate 14 and a tubular insert or riser 15.

The clamping plate 14 is non-circular, preferably elliptical, having a minor axis shorter than the diameter of the opening 11 and a major axis longer than the diameter for the opening 11. A pair of diametrically-opposed downwardly thickened flanges 15 extend into a central and otherwise circular opening 16 in the clamping plate 14 and have respective threaded socket openings 17 receiving respective screws 18. The openings 17 are on the major axis of the plate 14 and the distance between them is less than the diameter of the opening 11. Between the screws 18 on diametrically-opposite sides of the opening 16 is a pair of upstanding arcuate flanges 19a and 19b which have respective centrally disposed openings on the minor axis of the plate 14 which loosely receive respective outturned end portions 21 of a pair of mounting tongs 22 during installation of the afterset insert assembly.

It is apparent from the drawing that the clamping member 14 can be inserted through the opening 11 while suspended from the tongs 22 and then lifted by the tongs so that marginal areas 14a and 14b of the clamping plate 14 outwardly of the respective screws 18 can be held against the inner surface of the upper wall 12 of the duct section 10 with the screws extending upwardly through the opening 11 in diametrically-spaced relation thereto.

The riser 15 comprises an internally threaded cylinder having at its lower end a pair of inturned flanges 24 provided respectively with arcuate slots 25 which open at the edges of the respective flanges in the same direction circumferentially of the riser 15.

While the clamping plate 14 is held in position against the inner surface of the top wall 12 by the tongs 22, the riser 15 is slipped over the tongs with the open slots 25 spaced circumferentially with respect to the respective screws 18. Turning of the riser causes the shank portions of the screws 18 to enter the respective slots 25 so that the marginal areas of the flanges 24 adjacent the slots 25 are beneath the heads of the screws 18. The screws are then tightened to secure the riser 15 in position by clamping action and the tongs 22 are removed.

Various floor-outlet fittings (not shown) can be secured to the riser 15 by threaded couplings in a conventional manner and connected to wires pulled through the duct 10, the aligned openings 11 and 16, and the riser 15.

I claim:

1. An afterset insert assembly for an underfloor wiring duct, said insert assembly comprising an annular clamping member insertable through an opening in an upper wall of the duct and having marginal areas engageable with marginal areas of the inner surface of the upper wall about said opening, a pair of headed screws threaded into respective sockets in the clamping member and extending through said opening when said marginal areas of the member are held against said marginal areas of the inner surface of the upper wall thereby to dispose their heads and at least a part of their shank portions above the upper wall, and a tubular insert having a crosssectional dimension longer than the diameter of said opening, characterized in that the insert has a pair of inwardly-directed lower flange portions having respective slots opening circumferentially in the same circumferential direction with respect to the insert, the slots being spaced to receive the shank portions of the respective screws upon positioning of the insert on the outer surface of the upper wall of the duct and turning of the insert with respect to the element.

2. The afterset insert of claim 1 wherein the clamping member is non-circular and the opening in the upper wall of the duct is circular.

3. The afterset insert of claim 1 wherein a pair of flanges extend into the central opening of the clamping member and the threaded sockets are formed in the flanges.

4. The afterset insert of claim 1 wherein a pair of upstanding flanges are on opposite sides of the opening in the clamping element and have respective passages for reception of the end portions of a pair of mounting tongs.

References Cited

UNITED STATES PATENTS

| 1,784,637 | 12/1930 | Lindgren | 285—208 X |
| 1,901,232 | 3/1933 | Glowacki | 174—66 X |
| 2,987,330 | 6/1961 | Curran | 285—205 X |

FOREIGN PATENTS

| 140,352 | 3/1920 | Great Britain. |

CARL W. TOMLIN, *Primary Examiner.*

WAYNE L. SHEDD, *Assistant Examiner.*